United States Patent
Tutusaus et al.

(10) Patent No.: US 9,431,678 B2
(45) Date of Patent: *Aug. 30, 2016

(54) FUNCTIONALIZED CARBORANYL MAGNESIUM ELECTROLYTE FOR MAGNESIUM BATTERY

(71) Applicant: Toyota Motor Engineering & Manufacturing North America, Inc., Erlanger, KY (US)

(72) Inventors: Oscar Tutusaus, Ann Arbor, MI (US); Rana Mohtadi, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,488

(22) Filed: Aug. 14, 2015

(65) Prior Publication Data

US 2016/0181663 A1 Jun. 23, 2016

Related U.S. Application Data

(63) Continuation of application No. 14/581,768, filed on Dec. 23, 2014.

(51) Int. Cl.
*H01M 10/0568* (2010.01)
*H01M 10/054* (2010.01)
*H01M 10/058* (2010.01)
*H01M 4/46* (2006.01)
*H01M 4/02* (2006.01)

(52) U.S. Cl.
CPC .......... *H01M 10/0568* (2013.01); *H01M 4/466* (2013.01); *H01M 10/054* (2013.01); *H01M 10/058* (2013.01); *H01M 2004/027* (2013.01); *H01M 2300/0025* (2013.01)

(58) Field of Classification Search
CPC .......... H01M 10/0568; H01M 10/054; H01M 10/058; H01M 4/446; H01M 2004/027; H01M 2300/0017; H01M 2300/0025
See application file for complete search history.

(56) References Cited

U.S. PATENT DOCUMENTS

| 3,458,580 A | 7/1969 | Grafstein et al. | |
|---|---|---|---|
| 6,013,393 A * | 1/2000 | Taniuchi | H01M 4/382 429/317 |
| 7,419,623 B2 * | 9/2008 | Ivanov | H01M 8/1023 429/337 |
| 8,703,329 B2 | 4/2014 | Barbarich et al. | |
| 2014/0349178 A1 | 11/2014 | Mohtadi et al. | |
| 2014/0349199 A1 | 11/2014 | Mohtadi et al. | |

FOREIGN PATENT DOCUMENTS

WO 9631519 A1 10/1996

OTHER PUBLICATIONS

Carter et al., "Boron Clusters as Highly Stable Magnesium-Battery Electrolytes", Angew. Chem. Int. Ed. 2014, 53, 3173-3177.*
"Boron hydride chemistry", (1975), New York: Academic Press, Muetterties, E. L. (Ed.), 8 pages.
Guo et al, "Boron-based electrolyte solutions with wide electrochemical windows for rechargeable magnesium batteries", Energy Environ. Sci., 2012, pp. 9100-9106, vol. 5.
Korbe et al, "Chemistry of the Carba-closo-dodecaborate(−) Anion, CB11H12-", Chem. Rev., 2006, pp. 5208-5209, vol. 106.
Muldoon et al., "Electrolyte roadblocks to a magnesium rechargeable battery", Energy Environ. Sci., 2012, pp. 5941-5950, vol. 5.
Plesek et al., "Potential Applications of the Boron Cluster Compounds", Chem. Rev., 1992, pp. 269-278, vol. 92.
Shelly et al., ".eta.1-Benzene Coordination: The Synthesis and X-ray Crystal Structure of a Novel Silver Salt of the Weakly Coordinating Carborane Anion B11CH12-", J. Am. Chem. Soc., 1985, pp. 5955-5959, vol. 107.

* cited by examiner

*Primary Examiner* — Edu E Enin-Okut
(74) *Attorney, Agent, or Firm* — Christopher G. Darrow; Darrow Mustafa PC

(57) ABSTRACT

Electrochemical devices and processes for forming them employ a functionalized carboranyl magnesium electrolyte. The functionalized carboranyl electrolyte includes a carboranyl anion functionalized with at least one halide, or one alkyl, aryl, alkoxy, and/or aryloxy groups, or their partially or completely fluorinated analogs. In contact with the electrolyte, a non-noble metal cathodic current collector has unusually high oxidative stability >3.0V vs. a magnesium reference.

11 Claims, 2 Drawing Sheets

FUNCTIONALIZED CARBORANYL MAGNESIUM ELECTROLYTE FOR MAGNESIUM BATTERY

CROSS-REFERENCE TO RELATED APPLICATION

The present application is a continuation of U.S. application Ser. No. 14/581,768, filed Dec. 23, 2014, which is incorporated by reference in its entirety.

BACKGROUND

The present disclosure is directed in part to an electrochemical device having a functionalized carboranyl magnesium electrolyte. The present disclosure is also directed to a method for making such an electrolytic cell.

Magnesium batteries have received significant attention as potential replacements for lithium batteries due to their high volumetric capacity, lack of dendrite formation, and the relative inexpensiveness of magnesium. Discovery and development of suitable electrolytes for magnesium batteries has proven challenging however. Conventional inorganic magnesium salts have typically been found incompatible with reversible magnesium deposition as they tend to form an ion-blocking layer at the magnesium electrode during their electrochemical reduction. On the other hand, organic magnesium salts such as those derived from Grignard reagents have been found to be highly corrosive, particularly toward non-noble cathodes, possibly due to the presence of chloride co-anions.

Previous studies have shown the electrochemical compatibility and non-corrosiveness of magnesium boron clusters such as $MgB_{12}H_{12}$ with magnesium electrodes and their use in magnesium batteries. While having comparable electrochemical compatibility and non-corrosiveness in a magnesium cell as compared to the closo-borate containing electrolytes, the carboranyl electrolytes benefit from the inherently superior solubility of carboranyl clusters, relative to closo-borate clusters, in ethereal solvent.

In order to maximize current density it would be advantageous to develop electrolyte salts for use in magnesium batteries having yet higher solubility in suitable solvents.

SUMMARY

Disclosed, in various non-limiting embodiments, are electrochemical devices having a carboranyl magnesium electrolyte and a process of forming these electrochemical devices.

An electrochemical device is provided having a magnesium-containing anode, a cathode, and an electrolyte. The electrolyte includes a functionalized carboranyl magnesium salt having a formula of:

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

In yet another embodiment, provided herein is a process for preparing an electrochemical device. The process includes a step of connecting a magnesium-containing anode and a cathode via an external electrically conductive structure. The process also includes a step of contacting the anode and cathode with an electrolyte. The electrolyte includes a functionalized carboranyl magnesium salt having a formula of:

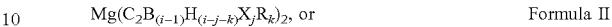

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

These and other features of the electrochemical device having a functionalized carboranyl magnesium electrolyte, and the process for making the same, will become apparent from the following detailed description when read in conjunction with the figures and examples, which are exemplary, not limiting.

BRIEF DESCRIPTION OF THE DRAWINGS

For a better understanding of the processes and devices having a functionalized carboranyl magnesium electrolyte, with regard to the particular variations and examples discussed herein, reference is made to the accompanying figures, in which.

DETAILED DESCRIPTION

Figure 1:
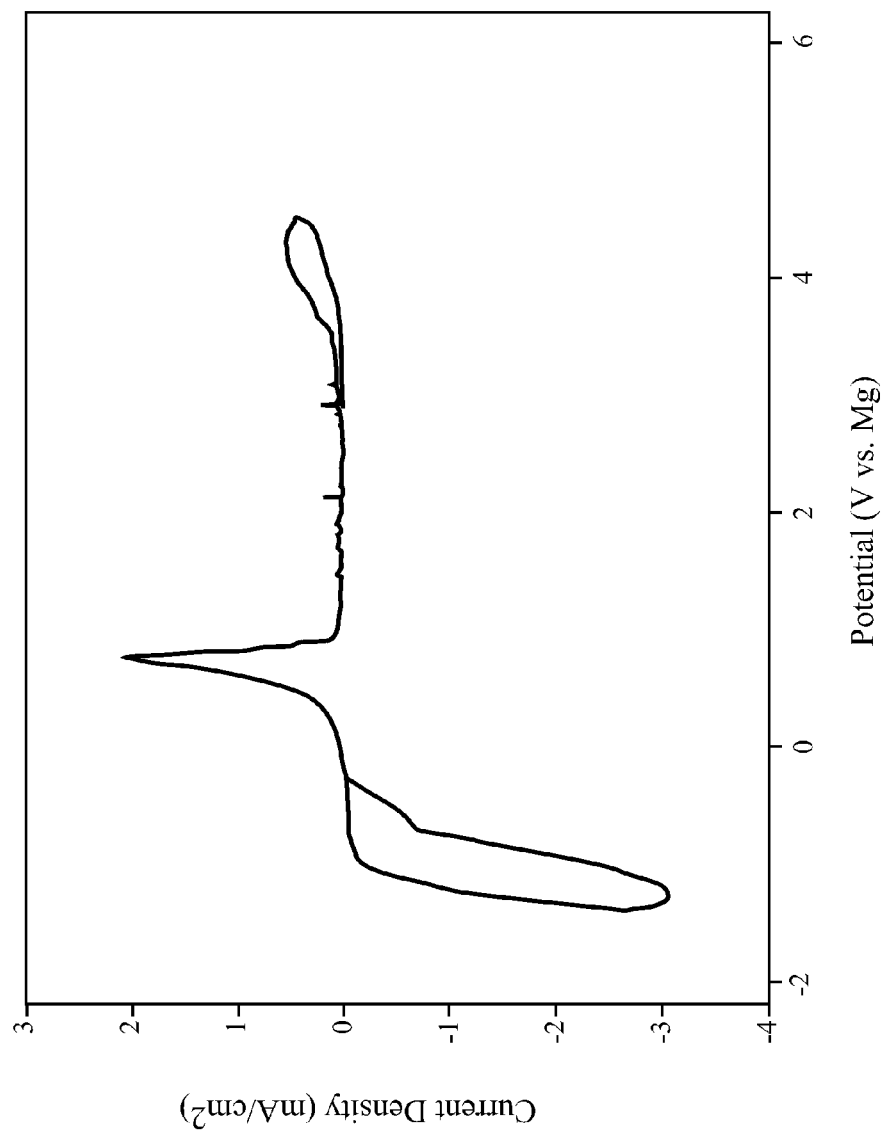
FIG. 1 is a cyclic voltammogram of a platinum (Pt) working electrode in contact with 0.2 M $Mg(CB_{11}H_{11}(CH_3))_2$ in tetraethylene glycol dimethyl ether (tetraglyme) at a scan rate of 5 mV/s.

The present disclosure provides electrochemical devices having electrolytes that include functionalized carboranyl magnesium salts. The results described here indicate that the present, functionalized carboranyl magnesium salts are capable of mediating reversible magnesium deposition at a magnesium anode, while being relatively non-corrosive and oxidatively stable at the cathodic current collector in a manner previously shown for non-functionalized carboranyl magnesium containing electrolytes. The present electrolytes are functionalized on the carboranyl anion with one or more alkyl or other substantially non-polar moieties in order to increase the electrolyte solubility in ethereal solvent.

The functionalized carboranyl magnesium salts can thus be particularly beneficial for use as electrolytes in magnesium batteries having a cathodic current collector made of non-noble metals such as stainless steel. The presently disclosed functionalized carboranyl magnesium salts combine the properties of electrochemical compatibility with reversible and repeated magnesium deposition at the magnesium anode, lack of corrosiveness at the cathodic current collector, and high solubility for enhanced energy density.

Accordingly, provided herein is an electrochemical device that includes an anode; a cathode; and an electrolyte in contact with the anode and the cathode. In general, the electrolyte will contain a salt having at least one magnesium cation ($Mg^{2+}$) and at least one functionalized carboranyl anion per stoichiometric unit. In some instances, the electrolyte will comprise a functionalized carboranyl magnesium salt having a formula of:

  Formula I

  Formula II or a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities. In many implementations, at least one of j and k will be equal to or greater than 1. In some implementations, k will be equal to or greater than 1.

In some implementations, the electrochemical device will include an electrolyte containing a functionalized carboranyl magnesium salt according to Formula I, with or without the other functionalized carboranyl salt according to Formula II.

As used herein, the term "alkyl" refers to a branched or straight-chain alkyl group having 1 to 18 carbons (C1-C18) which can optionally be partially or completely fluorinated. The term "aryl" as used herein refers to an aromatic hydrocarbon group having 6 to 14 carbons (C6-14), such as phenyl or naphthyl. An aryl can also optionally be partially or completely fluorinated. The term "alkoxy" as used herein refers to group having a formula —$OR_{alk}$ where $R_{alk}$ is an alkyl as defined above. An alkoxy group can optionally be partially or completely fluorinated. The term "aryloxy" as used herein refers to a group having a formula —$OR_{aryl}$, where $R_{aryl}$ is an aryl group as defined above. An aryloxy group can optionally be partially or completely fluorinated.

Generally, the functionalized carboranyl anion, represented above as $[CB_iH_{[(i+1)-j-k]}X_jR_k]^-$ or $[C_2B_{(i-1)}H_{(i-j-k)}X_jR_k]^-$ will be a functionalized anion of a closo-carborane. In some instances, it will be a functionalized anion of an icosahedral-closo-carborane, wherein the cumulative number of carbon and boron atoms, exclusive of H, X, and R groups, is 12.

In some implementations of the disclosed electrochemical device in which the functionalized carboranyl magnesium salt is a salt according to Formula I, R can be covalently attached to the carbon of the carboranyl anion. In some implementations wherein the functionalized carboranyl magnesium salt is a salt according to Formula I, R can be alkyl. In some such implementations, R can be methyl or hexyl.

The functionalized carboranyl magnesium salts employed in the electrochemical device described herein are materials that are either soluble or partially soluble in ethereal solvents under normal operating conditions for the associated electrochemical device. Suitable ethereal solvents can include, but are not limited to, tetrahydrofuran (THF), 1,2-dimethoxyethane (glyme), bis(2-methoxyethyl) ether (diglyme), triethylene glycol dimethyl ether (triglyine), tetraethylene glycol dimethyl ether (tetraglyme), or any other ethereal solvent capable of solubilizing the functionalized carboranyl magnesium electrolyte employed and suitable to the configuration and requirements of the electrochemical device. In certain embodiments, the functionalized carboranyl magnesium electrolyte will have solubility in any of the aforementioned solvents of at least 0.01 M at 25° C. and atmospheric pressure. Typically, a functionalized carboranyl magnesium salt of the present disclosure will have higher solubility in a given ethereal solvent than does an analogous carboranyl magnesium salt lacking any functional groups, X or R.

In some implementations, functionalized carboranyl magnesium salts can be obtained by a salt metathesis reaction between a functionalized carboranyl silver precursor and a magnesium halide. For example, a solution of magnesium halide, such as magnesium bromide can be added to a solution of functionalized carboranyl silver salt, such as $Ag(CB_{11}H_{11}(CH_3))$. Functionalized carboranyl silver precursor can be prepared fully solvent dry according to published methods. Typically both the magnesium halide and functionalized carboranyl silver reactants would be present in an ethereal solvent such as THF. The solid product resulting from reaction of the magnesium halide and the functionalized carboranyl silver salt, can be separated from the filtrate by filtration. In some cases, the collected solid is composed of solely silver halide, and the functionalized carboranyl magnesium salt can be obtained by removal of the solvent from the filtrate. In some instances, the collected solid contains the functionalized carboranyl magnesium salt in addition to the silver halide; and the functionalized carboranyl magnesium salt can be purified by extraction with an alkylated glycol, such as tetraglyme. The salt metathesis reaction generally proceeds according to Reactions A1 and A2:

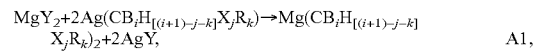  A1,

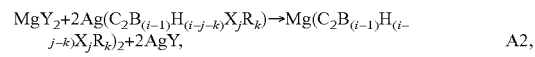  A2, where X, R, i, j, and k are as defined above, and Y is fluorine, chlorine, bromine, or iodine, independently of X. It is to be understood that functionalized carboranyl magnesium salts of the present disclosure can be derived from a wide variety of functionalized carboranyl metal precursor salts using salt metathesis reactions of the type shown in Reactions A1 and A2, and that these reactions are not limited to using silver salts as precursors. For example, a functionalized carboranyl cesium salt of the type shown below in Example 1 is a suitable precursor for production of the corresponding functionalized carboranyl magnesium salt via salt metathesis.

The electrolytes comprising functionalized carboranyl magnesium salts provided herein, when placed under an electric potential in a disclosed electrochemical device, exhibit high oxidative stability of well over 3.0 V (vs. Mg reference). In some instances the oxidative stability of the electrolytes exceeds 3.5 V vs. Mg.

Figure 2:
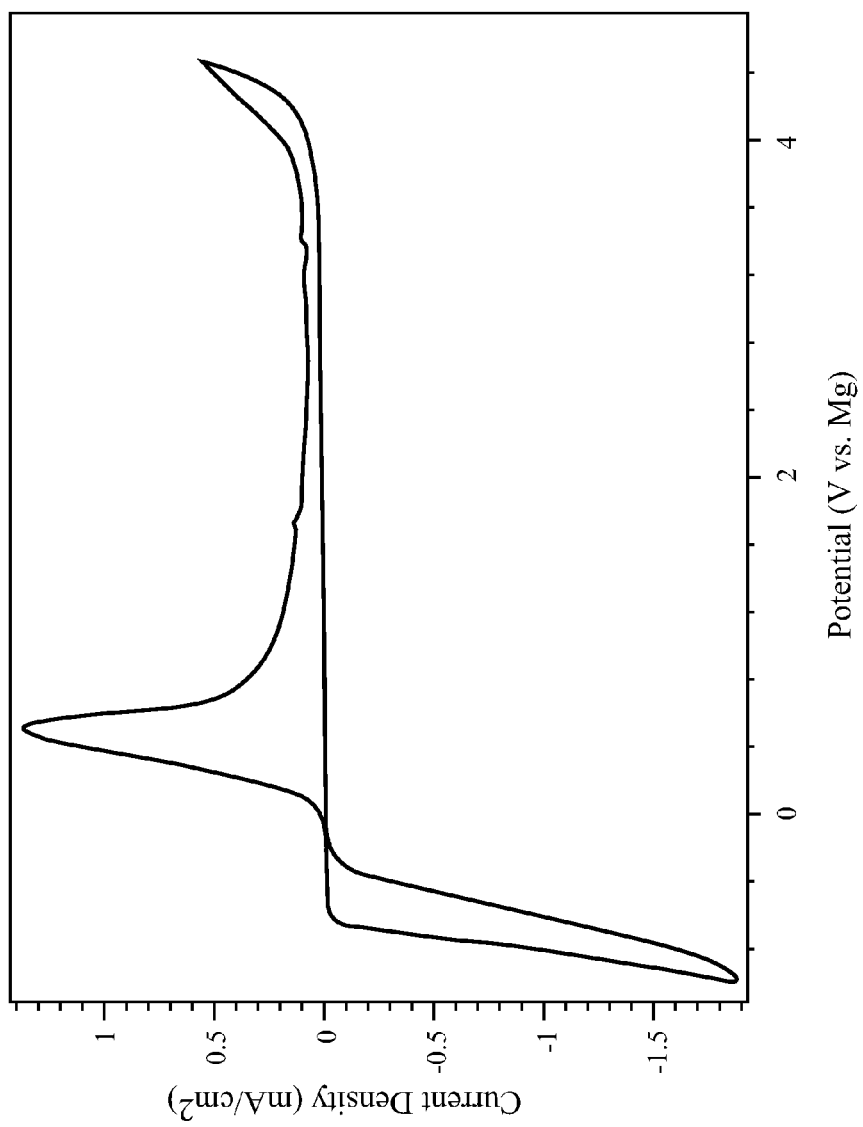
FIG. 2 is a cyclic voltammogram of a Pt working electrode in contact with 0.1 M $Mg(CB_{11}H_{12})_2$ in tetraglyme at a scan rate of 5 mV/s.

In an example, $Mg(CB_{11}H_{11}(CH_3))_2$ in tetraglyme has oxidative stability to about 3.5 V vs. Mg on a platinum disk cathode as measured against a magnesium reference electrode, as shown in FIG. 1. Comparing FIG. 1 to FIG. 2, the electrolyte containing a functionalized carboranyl magnesium salt supports a similar current density to that of an electrolyte containing an analogous non-functionalized carboranyl magnesium salt, $Mg(CB_{11}H_{12})_2$, in an otherwise similarly configured cell. Additionally, the electrolyte containing a functionalized carboranyl magnesium salt has similar oxidative stability compared to that of the electrolyte containing its analogous non-functionalized carboranyl magnesium salt. The functionalized and non-functionalized carboranyl magnesium salts are each oxidatively stable in this case at an electrical potential up to about 3.5 V vs. Mg.

An electrochemical device according to the present disclosure and having an electrolyte which includes a functionalized carboranyl magnesium salt will, in many implementations, be a magnesium battery wherein a reduction/oxidation reaction according to Reaction B occurs:

$$Mg_0 \leftrightarrows Mg^{2+} + 2e^-$$ B.

In many implementations, the electrochemical device will be a secondary battery or a subunit of a secondary battery. In such implementations, it is to be understood that the term "anode" as used herein refers to an electrode at which magnesium oxidation occurs during device discharge and at which magnesium reduction occurs during device charge. Similarly, it is to be understood that the term "cathode" refers in such implementations to an electrode at which a cathode material reduction occurs during device discharge and at which a cathode material oxidation occurs during device charge.

In such implementations, the anode can comprise any material or combination of materials effective to participate in electrochemical oxidation of magnesium during a device discharge. Similarly, the anode can comprise any material or combination of materials effective to participate in electrochemical reduction of magnesium cations and to incorporate reduced magnesium during a device charging event. In some implementations, the anode can consist essentially of elemental magnesium (i.e. magnesium atoms having no formal charge) or comprise at least one surface layer of elemental magnesium. In other implementations, the anode can comprise a magnesium-containing alloy and/or an insertion-type magnesium electrode such as a tin electrode, containing magnesium in complex or alloy with other materials to the extent the cell is charged.

The cathode can comprise any material or combination of materials effective to participate in electrochemical insertion of a cathode material during a device discharge. Similarly, the cathode can comprise any material or combination of materials effective to participate in electrochemical extraction of said cathode material during a device charging event. In some variations, the cathode material which is inserted at the cathode during a device discharge and extracted from the cathode during device charging event can comprise magnesium. Suitable but non-exclusive examples of cathode materials can include a Chevrel phase molybdenum composition such as $Mo_6S_8FeSiO_4$ (reversibly $MgFeSiO_4$), $MnO_2$, $MgFePO_4$, sulfur, organosulfur compounds, an organic cathode material such as poly(2,2,6,6-tetramethyl-piperidinyl-1-oxy-4-yl methacrylate) (PTMA), air or any other suitable materials.

The electrochemical device can additionally include at least one external conductor, configured to enable electrical communication between the anode and the cathode. In a simple implementation, the at least one external conductor can be a single conductor such as a wire connected at one end to the anode and at an opposite end to the cathode. In other implementations, the at least one external conductor can include a plurality of conductors putting the anode and the cathode in electrical communication with a power supply device configured to apply an electric potential to the electrochemical device during a charging event, with other electrical devices situated to receive power from the electrochemical device, or both.

Also provided herein is a process for preparing an electrochemical device. The process includes a step of contacting an anode and a cathode with an electrolyte comprising a functionalized carboranyl magnesium salt. The anode, the cathode, and the electrolyte are all as described above with respect to the disclosed electrochemical device. The process can include an additional step of putting the anode and the cathode into electrical communication with one another via at least one external conductor. The at least one external conductor, when present, is also as described above with reference to the electrochemical device.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1

Synthesis of Cesium
1-hexyl-1-carba-closo-dodecaborate,
$Cs[1\text{-Hex-}CB_{11}H_{11}]$ To a solution of $Cs(CB_{11}H_{12})$ (1.38 g, 5 mmol) in dry THF (40 mL) under argon, n-BuLi solution in hexane (1.6 M, 6.4 mL, 10.24 mmol) was added drop-wise with stirring at −78° C. The reaction mixture was stirred for 15 min at −78° C., then warmed to 0° C. and further stirred for 1 h. The resulting white suspension was added hexyl iodide (1.9 ml, 12.9 mmol) at 0° C., then the mixture was allowed to warm to room temperature and stirred for 5 h. Water was added slowly and the solvent was removed under vacuum. The residue was extracted with $Et_2O$ (3×50 mL), and the resulting solution was washed with a 20% aqueous solution of CsCl (2×50 mL). The combined CsCl wash was extracted with $Et_2O$ (3×50 mL). The combined organic phase was dried over $Cs_2CO_3$ and evaporated to dryness. The residue was recrystallized from hot water, washed with water and pentane, and dried at under vacuum at 120° C. to obtain $Cs(1\text{-Hex-}CB_{11}H_{11})$ as a white solid. It is to be understood that an analogous route can be employed for the synthesis of Cesium 1-methyl-1-carba-closo-dodecaborate, the precursor to the functionalized carboranyl magnesium salt employed in the electrochemical device of FIG. 1. As noted above, the functionalized carboranyl cesium salt is a suitable precursor for production of the corresponding functionalized carboranyl magnesium salt via salt metathesis.

Example 2

Preparation of Electrochemical Devices and Testing Thereof

Electrochemical testing was conducted in a three-electrode BASi 4 dram shell vial placed inside an MBraun glove box at 25° C. at less than 0.1 ppm $O_2$ and $H_2O$ content. The electrodes used in all experiments were as follows: working electrode—0.02 cm² platinum; counter electrode—magnesium ribbon (BASi); reference electrode—magnesium wire (BASi). The working electrode was polished, sonicated, and kept in a dry vacuum oven prior to each experiment. The surfaces of all magnesium electrodes were thoroughly rubbed with a glass slide prior to use to remove any possible oxides.

Electrochemical testing was conducted using a BioLogic potentiostat operated at a scan rate of 5 mV·s⁻¹ and data were acquired and analyzed with EC-lab Software®.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrochemical device, comprising:
   an anode comprising magnesium;
   a cathode; and
   an electrolyte in contact with the anode and the cathode, the electrolyte comprising a functionalized carboranyl magnesium salt having a formula of:

$$Mg(CB_iH_{[(i+1)-j-k]}X_jR_k)_2, \qquad \text{Formula I}$$

$$Mg(C_2B_{(i-1)}H_{(i-j-k)}X_jR_k)_2, \text{ or} \qquad \text{Formula II}$$

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

2. The electrochemical device as recited in claim 1, wherein the electrolyte comprises a functionalized carboranyl magnesium salt having a formula according to Formula I.

3. The electrochemical device as recited in claim 1, wherein an anion of the functionalized carboranyl magnesium salt of any of formulae I-II is an icosahedral closo-carboranyl anion.

4. The electrochemical device as recited in claim 1, wherein the functionalized carboranyl magnesium salt is obtained by contacting functionalized carboranyl silver salt with a magnesium halide.

5. The electrochemical device as recited in claim 1, wherein the electrolyte is stable at an electrical potential greater than 3.0 V.

6. The electrochemical device as recited in claim 1, wherein the cathode comprises an organic cathode material.

7. A process for preparing an electrochemical device, comprising:
   contacting an anode and a cathode with an electrolyte comprising a functionalized carboranyl magnesium salt having a formula of:

$$Mg(CB_iH_{[(i+1)-j-k]}X_jR_k)_2, \qquad \text{Formula I}$$

$$Mg(C_2B_{(i-1)}H_{(i-j-k)}X_jR_k)_2, \text{ or} \qquad \text{Formula II}$$

a combination of at least two of the foregoing, wherein i is an integer within a range of 5 through 11, inclusive; j is an integer within a range of 0 through i inclusive; k is an integer between 0 and i inclusive; each X, independently of each other X, is fluorine, chlorine, bromine, or iodine; and each R, independently of each other R, is an alkyl, aryl, alkoxy, aryloxy, their partially or completely fluorinated analogues, or a moiety combining the aforementioned functionalities.

8. The process as recited in claim 7, wherein the electrolyte comprises a functionalized carboranyl magnesium salt having a formula according to Formula I.

9. The process as recited in claim 7, wherein the functionalized carboranyl magnesium salt comprises an icosahedral closo-carboranyl anion.

10. The process as recited in claim 7, wherein the functionalized carboranyl magnesium salt is obtained by contacting functionalized carboranyl silver salt with a magnesium halide.

11. The process as recited in claim 7, wherein the electrolyte is stable at an electrical potential greater than 3.0V.

* * * * *